Patented Feb. 25, 1930

1,748,580

UNITED STATES PATENT OFFICE

MICHAEL G. MINAEFF, OF BROOKLYN, NEW YORK, ASSIGNOR TO THE LARVEX CORPORATION, OF NEW YORK, N. Y., A CORPORATION OF NEW YORK

MOTHPROOFING

No Drawing.   Application filed October 11, 1928.  Serial No. 311,969.

This invention relates to moth proofing and is herein disclosed as applied to woolen goods which are moth proofed with hydrocarbon derivatives of thiourea.

It has been found that when the ordinary woolen fabric of commerce is immersed in a suitable solution of allyl-thiourea, phenyl-thiourea, or o-tolyl-thiourea, it becomes immune from attack by moth larvæ, such as normally attack and destroy woolen materials under similar conditions.

A two per cent solution has been found satisfactory. It was found that long immersion was unnecessary, and that the fabric was not affected in any degree, except for its immunity to attack by moth larvæ.

In some cases it is advisable to include another substance or substances, especially such as will facilitate the wetting of the woolen material to be mothproofed. This may be advantageous whether the material is mothproofed by spraying or by immersion.

*Example 1.*—An acetone solution was prepared containing two per cent phenyl thiourea and woolen goods were wetted therewith by immersion, then drained and dried. These goods proved to be unattacked by moth larvæ when untreated goods, under parallel conditions, were destroyed by the larvæ.

*Example 2.*—A similiar solution of allyl-thiourea was prepared and with it was treated other woolen goods with the same mothproofing result.

*Example 3.*—A similar solution of o-tolyl-thiourea was prepared and with it was treated other woolen goods with the same mothproofing result.

It is also possible to use an aqueous solution for the moth proofing operation, preferably first dissolving the thiourea derivative in acetone or other suitable organic solvent and then mixing with water. It is usually preferable to include in the moth proofing solution a wetting agent which causes the solution to wet and distribute itself rapidly and uniformly through the wool.

The foregoing compounds all contain one amino group in which there is no substitute for hydrogen, and also one amino group containing a hydrocarbon radical.

Having thus described certain embodiments of my invention, what I claim is:

1. The process of moth-proofing material which consists in treating it with a solution carrying a thiourea having one amino group in which a hydrocarbon radical is substituted for one hydrogen and in which one amino group contains no substitute for hydrogen.

2. The process of moth-proofing material which consists in treating it with an aqueous solution carrying a small percentage of a thiourea in which a hydrocarbon radical is substituted for one hydrogen and in which one amino group contains no substitute for hydrogen.

3. The process of moth-proofing material which consists in treating it with a solution carrying a small percentage of a thiourea in which a benzine ring hydrocarbon radical is substituted for one hydrogen and in which one amino group contains no substitute for hydrogen.

4. The process of moth-proofing material which consists in treating it with a solution carrying a small percentage of a thiourea in which a toluene radical is substituted for one hydrogen and in which one amino group contains no substitute for hydrogen.

5. A fibrous material carrying a thiourea having one amino group in which a hydrocarbon radical is substituted for one hydrogen and in which one amino group contains no substitute for hydrogen.

6. A fibrous material carrying a small percentage of a thiourea in which a hydrocarbon radical is substituted for one hydrogen and in which one amino group contains no substitute for hydrogen.

7. A fibrous material carrying a small percentage of a thiourea in which a benzine ring hydrocarbon radical is substituted for one hydrogen and in which one amino group contains no substitute for hydrogen.

Signed at 250 Park Avenue, in the county of New York and State of New York this 4th day of October, A. D. 1928.

MICHAEL G. MINAEFF.